Sept. 9, 1969     F. J. BAIER ET AL     3,465,426

POWDER ON FOIL CAPACITOR

Filed May 2, 1966

INVENTORS
FREDERICK J. BAIER
WILLIAM F. VIEROW
BY
Robert Levine
ATTORNEY

United States Patent Office 3,465,426
Patented Sept. 9, 1969

3,465,426
POWDER ON FOIL CAPACITOR
Frederick J. Baier, Indianapolis, and William F. Vierow, Carmel, Ind., assignors to P. R. Mallory & Co., Inc., Indianapolis, Ind., a corporation of Delaware
Filed May 2, 1966, Ser. No. 546,817
Int. Cl. H01g 9/00
U.S. Cl. 29—570                                     18 Claims

ABSTRACT OF THE DISCLOSURE

The disclosure relates to electrical capacitors and a process for manufacturing anodes for the electrical capacitors which includes the steps of providing a sheet of film-forming metal having separate areas thereof associated with each of the capacitors, superimposing a barrier over the sheet so that the voids in the barrier are coextensive with the separate areas, depositing moistened powder of the metal within the voids and sintering each deposit of powder in situ to convert it to a porous mass whereby the porous mass and its associated area on a sheet constitute an anode suitable for use in an electrolytic capacitor.

---

The present invention relates to electrolytic capacitors and more particularly relates to novel solid electrolytic capacitors.

It is well-known that solid electrolytic capacitors may be manufactured by the following method: A sintered porous slug of a metal such as tantalum, zirconium, aluminum, niobium, and titanium is anodized in an electrolyte to form an oxide layer on the surfaces of the slug. The oxide layer, which has assymetrical conducting characteristics, serves as a dielectric for the capacitor. A semiconductor coating is applied over the oxide layer and an electrically conducting material, such as graphite and silver paint, is applied to the semiconductor layer. The semiconductor coating and electrically conducting coating serves as a cathode and the original metallic slug serves as an anode. After connecting leads to the base metal (anode) and to the conductive coating (cathode), the solid electrolytic capacitor is sealed in a metal case or is molded with a plastic resin.

As a specific example of the above established general process, assume that the basic slug is a porous tantalum slug obtained by pressing and sintering tantalum powder. The tantalum slug is then anodized in an electrolyte such as phosphoric acid to form an oxide (dielectric) layer on the surfaces thereof. A film of semiconductor material, such as manganese dioxide, is closely attached to the oxide layer by dipping the anodized slugs in an aqueous solution of manganese nitrate and converting to manganese dioxide by pyrolysis. The manganese dioxide layer is then coated with a conducting layer such as graphite and silver.

Solid electrolytic capacitors have also been formed by depositing metallic powder in a carrier liquid onto a film forming metal foil provided with depressions or indentations for containing the metallic powder. The metallic powder and foil must be of the same material, e.g., tantalum powder and tantalum foil. The powder is sintered with and bonded to the foil to form a solid pellet having a porous structure. The foil and pellet are then anodized to form a dielectric layer and a semiconductor coating and conductor coating are added as previously described to form a cathode. The foil and the pellet serve as an anode for the capacitor.

The powder on foil approach to capacitor manufacturing was conceived to eliminate handling problems for small solid electrolytic capacitors. The handling of powder on foil capacitors is significantly reduced as compared to the handling involved in the use of individual sintered slugs. This is true because the foil containing a plurality of individual capacitors are separated from the foil at the end of the major processing steps. The powder on foil approach to capacitor fabrication also eliminates much contamination and damage during processing by eliminating the pressing of individual slugs and the use of binders. The powder on foil approach to capacitor fabrication lends itself to mechanization.

There are problems involved in the fabrication of powder on foil capacitors as previously described. These problems will be discussed in the following paragraphs.

It is rather difficult to dispense a controlled amount of powder on a production basis by the dropper techniques previously disclosed. To do so requires rather elaborate control of the dropping means, including control of the ambient temperature, viscosity of the carrier liquid, and wetability of the dropping means orifice. If larger pellets are required, more than one controlled droplet is usually necessary to obtain the desired pellet size.

The foil must be dimpled to form a means for containing the powder droplet. This dimpling requirement introduces undesirable stresses in the foil and requires an extra step in the production process.

The present invention has eliminated the above-mentioned problems and has greatly expanded the capability of powder on foil capacitor fabrication techniques. In the practice of the present invention, a foil is placed against a backing plate and a template is placed against the foil and secured to the backing plate. The template has a plurality of openings of desired shape. A slurry of powder and a carrier liquid or a moistened mass of powder is spread over the template so as to fill the openings and contact the foil. A squeegee or similar straight edge means is then used to remove the excess slurry. In some cases, it has been found that a dry mass of metallic powder is as good as a slurry in the practice of the present invention. The dry powder may be moistened on the template to facilitate compacting in the cutouts of said template. The template may then be removed to leave a plurality of controlled deposits of powder formed on the foil or the assembly of the backing plate, template and foil may be placed in a furnace to fuse the powder to the foil and to harden the powder into porous pellets. If the latter technique is used, the template and backing plate must be constructed of a material that will not melt at the sintering temperature of the powder. If the powder is not sintered and fused to the foil while the template is still secured to the foil and the backing plate, the template must be carefully removed so as not to disturb the powder bodies deposited on the foil. This is especially true if the height of the bodies, or the thickness of the template, is more than a few thousandths of an inch. It has been found that nonwetting materials such as Teflon are suitable template materials and facilitates the removal of the template. Materials such as boron nitride and molybdenum having a high melting temperature, are suitable template materials when the powder is fused or sintered while the template is still secured to the foil and backing plate.

The use of a template means for applying controlled deposits of powder onto a foil is advantageous in that many desposits can be formed at one time and various sizes and shapes of deposits can be produced. The quantity of powder deposited by the method of the present invention is readily determined by the thickness of the template and the area of the openings therein.

After the powder bodies are fused to the foil and sintered, the foil containing the pellets (hardened powder bodies) can be processed by anodizing, applying a semiconductor coating, and a conductor coating as previously described.

It is an object of the present invention, therefore, to provide a novel process for manufacturing solid electrolytic capacitors.

It is another object of the present invention to provide a novel process for fabricating solid electrolytic tantalum capacitors.

It is a further object of the present invention to provide a process for fabricating anodes for solid electrolytic capacitors.

It is an object of the present invention to provide a process for fabricating solid electrolytic capacitors which decreases the amount of handling of individual capacitors during production, eliminates the requirement for a binder and avoids pressing, thereby substantially improving the initial quality of anodes, and reduces damage during processing.

It is an object of the present invention to provide a novel process for manufacturing solid electrolytic tantalum capacitors wherein deposits of tantalum powder are applied to a tantalum foil through openings in a template and are sintered thereto and the foil as a whole is processed until the final step wherein the individual capacitors are separated therefrom and packaged.

It is still another object of the present invention to provide a novel process for manufacturing solid electrolytic tantalum capacitors wherein deposits of tantalum powder are applied to a tantalum foil through cutouts in a template and are sintered thereto while said template is held to said foil.

It is still a further object of the present invention to fabricate a powder on foil capacitor without providing a depression in the foil for retaining the powder.

It is yet another object of the present invention to provide a method for fabricating powder on foil capacitors wherein a more even particle distribution is obtained than is obtained using previously disclosed techniques.

It is yet another object of the present invention to provide a method for fabricating powder on foil capacitors wherein dry powder, moistened powder, or a slurry of powder is dispensed in tantalum foil.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention is a novel method for fabricating powder on foil capacitors wherein controlled deposits of powder are deposited on the foil through a template. The deposits are sintered either before or after the template is removed depending on the characteristics of the deposits. The sintering before the template is removed may be a partial sintering operation to harden the powder deposits, thereby facilitating removal of the template without damaging the deposits. The powder may be applied to the template as a slurry, as a moistened mass, or as dry powder.

Figure 1:
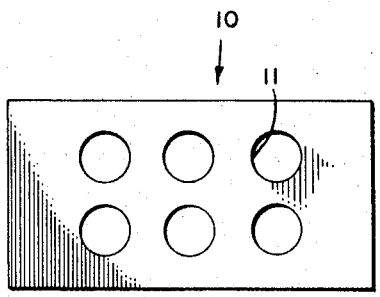
FIGURE 1 is a top view of a typical template which may be used in the practice of the present invention.

Referring now to the drawing, and particularly to FIGURE 1, the practice of the present invention can be visualized in conjunction with the following description.

The template 10 is an apertured means or pattern means for defining the shape of a powdered metallic body deposited on a metallic foil. In the illustrative embodiment of FIGURE 1, a plurality of equally spaced circular cutouts 11 are disposed in the template 10. However, in the practice of the present invention, the cutouts may be any desired shape and may be disposed anywhere on the template. Square cutouts, hexagonal cutouts, star-shaped cutouts, etc., may be desirable.

The template 10 may be constructed of several different materials. If the template 10 is to be removed before the powder deposits are sintered and/or fused to the foil as discussed previously, a nonwetting template material, such as Teflon, is desirable. The nonwetting feature facilitates the removal of the template without damaging or disturbing the powder deposits. If the template 10 is to be held against the foil during sintering operations as discussed previously, a high melting point material, such as boron nitride or molybdenum, is required.

Figure 2:
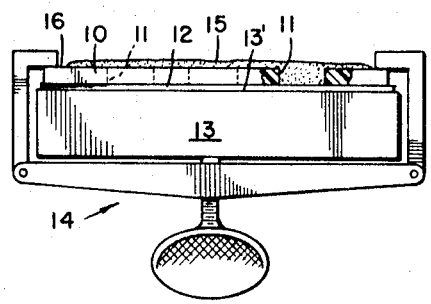
FIGURE 2 is a side view of an assembly including a backing plate, metal foil, template and means for securing the template and foil to the backing plate. Also shown in FIGURE 2 is a slurry or a moistened mass of metal powder which has been spread over the template.

Referring now to FIGURE 2 an assembly including the template 10, piece of film forming metal 12, previously referred to as the foil, a backing plate 13 and means 14 for securing the template 10 and piece of film forming metal 12 to the backing plate 13 can be discussed.

The film forming metal 12 is placed against a generally flat surface 13' of the backing plate 13 and the template 10 is placed over the film forming metal and is secured thereto. The illustrated means 14 is a simple clamping means for holding the template 10 and film forming metal 12 to the backing plate 13. Obviously, many other clamping means could be devised to accomplish that objective.

It can be seen in FIGURE 2 that a slurry 15 or moistened mass of metallic powder has been spread over the template 10 so as to fill the cutouts 11 and be in contact with the film forming metal 12. In subsequent process operations this slurry 15 or moistened mass will be scraped or squeegeed even with the top surface 16 of the template 10. It can be seen, therefore, that the size of the powder deposits formed on the film forming metal 12 depends on the open area of the cutouts 11 and the thickness of the template 10.

Figure 3:
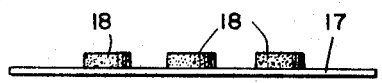
FIGURE 3 is a side view of a strip of metallic foil with deposits of powder disposed thereon.

Referring now to FIGURE 3, a piece of film forming metal 17 with powder deposits 18 disposed thereon can be discussed.

As discussed previously, the deposits 18 are deposited through cutouts in a template and then fused or sintered to the film forming metal 17. The sintering may occur either before or after the template is removed, depending on the template material being used and the thickness of the deposits. The requirement is for the template to be removed without damaging or disturbing the powder deposits 18. If the deposits 18 are thin, from .003 inch to .125 inch, the template can usually be removed without disturbing the deposits 18 providing the template material is nonwetting and does not adhere to the deposits. If the deposits 18 are considerably thicker, it may be desirable to fuse or partially sinter the deposits 18 to the film forming metal 17 while the template is still secured to the film forming metal. A configuration such as that shown in FIGURE 2 is satisfactory for sintering with the template secured to the film forming metal.

Figure 4:
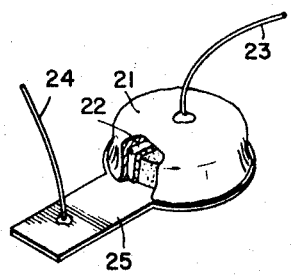
FIGURE 4 is a perspective view of a capacitor fabricated by the method of the present invention.

Referring now to FIGURE 4 a capacitor fabricated by the method of the present invention may be discussed. After the aforementioned powder deposits are sintered to the film forming metal so as to provide a plurality of porous sintered pellets bonded to the film forming metal, the pellets and film forming metal are anodized in accordance with standard practices to obtain an oxide dielectric layer. After the anodization step is completed, a semiconductor coating and a conductive coating are applied to the pellets and the film forming metal in accordance with standard solid electrolytic capacitor fabrication techniques.

In FIGURE 4, the conductive coating is the top coating 21 and the semiconductor coating is the second coating 22. A terminating means is soldered or otherwise connected to the top coating 21 and a terminating means 24 is welded or otherwise connected to the film forming metal tab portion 25 extending away from the capacitor. The terminating means 24 is connected to the anodized tab portion 25 at a point away from the semiconductor coating 22 and conductive coating 21 so as to prevent shorting the terminating means 23 and 24. In the practice of the present invention, a masking means is used to limit the area covered by the semiconductor coating 22 and the conductive coating 21. Suitable masking materials are epoxy or heat resistant varnish.

Figure 5:
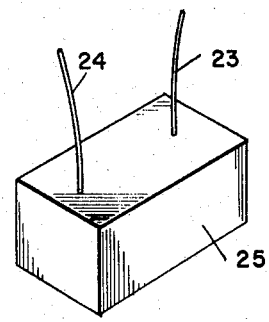
FIGURE 5 is a perspective view of an encapsulated capacitor fabricated by the method of the present invention.

Referring now to FIGURE 5, an encapsulated capacitor fabricated by the method of the present invention can be seen. The capacitor with the terminating means 23 and 24 shown in FIGURE 4 is encapsulated in an epoxy resin or other suitable compound to produce the body 26 shown in FIGURE 5. Other packaging techniques, such as hermetically sealed containers, can be used to protect capacitors fabricated by the method of the present invention.

With the above description in mind, and by making reference to the drawing figures, the following illustrative method for fabricating solid electrolytic tantalum capacitors will serve to convey the details of the present invention.

Annealed high purity tantalum foil is cut in shapes suitable for processing. This foil is placed against a backing plate having a generally smooth and flat surface. A template having a predetermined thickness and a plurality of cutouts is placed over the foil against the backing plate and is secured thereto by suitable securing means. The illustrative assembly of FIGURE 2 is satisfactory for this portion of the process.

A slurry or moistened mass consisting of tantalum powder and a liquid such as water, various alcohols, or other organic or inorganic materials which are readily removed by drying, do not react with tantalum, and do not contaminate the tantalum after evaporation is spread over the template as is shown in FIGURE 2. Liquids for the slurry are selected on the basis of viscosity and surface tension as well as ease of removal from the powder. Slurries formed by mixing tantalum powder in liquids such as distilled water, isopropyl alcohol, benzene, toluene, distilled water mixed with glycol, and the like have proved satisfactory for the practice of this invention. The use of a slurry or a moistened mass of metallic powder provides a smooth surface of the pellet as well as a pellet having the proper density. The powder can, however, be moistened after it is applied to the template in order to facilitate compacting in the cutouts of the template.

The slurry or moistened powder is spread over the template to completely fill the cutouts in the template and so as to be in contact with the tantalum foil. The excess slurry is then removed by moving a straight edge means over the top surface of the template.

The template is then removed without disturbing the powder deposits on the foil and the deposits are then sintered on the foil. As stated previously, it may be necessary in some cases to sinter or, at least, to partially sinter the powder while the template is still secured against the foil. A drying operation is required before the sintering operation. The purpose of the drying operation is to partially dry the powder deposits so as to prevent an explosion of the powder deposit caused by steam resulting from trapped moisture and the sintering environment.

After the sintering operation, the tantalum foil and the plurality of porous sintered pellets disposed therein are anodized to obtain a dielectric oxide coating thereover. The anodization process is carried out in accordance with standard anodization procedures. After the anodization process, a semiconductor coating, such as manganese dioxide is applied over the dielectric coating on the pellet and a portion of the foil surrounding the pellet. After the semiconductor coating is applied, a conductive coating, such as graphite and silver, is applied over the semconductor coating and is limited to the area covered by the semiconductor coating.

The next step consists of attaching a terminating means to the conductive coating, thereby providing a cathode terminal, and attaching a terminating means to the tantalum foil adjacent to the pellet, thereby providing terminal.

The individual capacitors, with an anode terminal and cathode terminal are then separated from the balance of the foil. Depending on the thickness of the foil used, separation of individual capacitors from the foil may be facilitated by precutting around the area of the pellet before the powder is deposited. This precutting may be accomplished by a punching operation which partially cuts through the foil.

The final step in the process involves packaging the individual capacitors as was discussed in conjunction with FIGURE 5.

The present invention, as hereinbefore described, is merely illustrative and not exhaustive in scope. Since many widely different embodiments of the invention may be made without departing from the scope thereof, it is intended that all matter contained in the above description and shown in the acommpanying drawing shall be interposed as illustrative and not in a limiting sense.

What is claimed is:

1. In a method for making anodes suitable for use in electrical capacitors wherein separate porous masses of a film forming metal are sintered in situ to a face of a sheet of said metal at selected areas thereon from a moistened powder of said metal so as to constitute together with an associated area of said sheet the anode of one of said capacitors, the improvement which comprises:

superimposing a barrier containing voids over the face of said sheet so that said voids are coextensive with said selected areas, and depositing the powder of said film forming metal in said voids until they are substantially completely filled whereby the powder assumes a mass shape conforming with that of the voids.

2. The method of claim 1 wherein the powder of said metal is deposited in said voids in a moistened condition.

3. The method of claim 2 wherein the powder of said metal is deposited in said voids from a slurry comprised of said powder and a carrier liquid.

4. The method of claim 1 wherein the powder of said metal is deposited in said voids in a dry state and is then moistened with a liquid.

5. The method of claim 1 wherein the barrier is removed from the sheet prior to sintering the powder masses thereon.

6. The method of claim 1 wherein the powder masses are partially sintered prior to removing the barrier from said sheet.

7. The method of claim 1 which further comprises clamping the barrier to said sheet while it is superimposed over said face to prevent relative movement therebetween.

8. In the manufacturing of electrical capacitors, a method for making anodes suitable for use in said capacitors which comprises the steps of:

providing a sheet of a film-forming metal having separate areas thereof associated each with one of said capacitors, superimposing a barrier containing voids over the face of said sheet so that said voids are coextensive with said separate areas, depositing moistened powder of said metal within said voids whereby said powder occupies at least a portion of said voids and contacts said sheet at said selected areas, and sintering each deposit of powder in situ to said sheet to convert it to a porous mass of said metal bonded to said sheet whereby said porous mass and its associated area of said sheet constitutes the anode for one of said capacitors.

9. The method of claim 8 including the step of removing said barrier from said sheet prior to sintering said powder deposits thereto.

10. The method of claim 8 wherein said moistened powder consists essentially of a metal selected from the group consisting of tantalum, aluminum, zirconium, niobium, or titanium and a liquid selected from the group consisting of water, isopropyl alcohol, benzene, toluene and water with glycol.

11. The method of claim 10 wherein said powder and said sheet are tantalum and said liquid is water.

12. The method of claim 8 wherein said barrier is a template.

13. In the manufacturing of electrical capacitors, a method for making anodes suitable for use in said capacitors which comprises the steps of:

providing a sheet of a film-forming metal having separate areas thereof associated each with one of said capacitors, superimposing a barrier over said sheet at areas other than said separate areas thereby providing voids in said barrier coextensive with said separate areas, depositing moistened powder of said metal within said voids whereby said powder occupies at least a portion of said voids and contacts said sheet at said selected areas, and sintering each deposit of powder in situ to said sheet to convert it to a porous mass of said metal bonded to said sheet whereby said porous mass and its associated area of said sheet constitutes the anode for one of said capacitors, anodizing the sheet of film-forming metal and the porous masses sintered to said sheet to form a dielectric oxide coating of said metal on the surfaces of said sheet and said porous masses, applying cathode layers over each of said porous masses, attaching terminal means to said cathode layers, and attaching terminal means to said sheet area associated with each porous mass.

14. The method of claim 13 which further comprises separating each of the respective areas of said sheet from the others.

15. The method of claim 13 wherein the cathode layers are applied to each porous mass by:

forming a coating of a solid electrolyte over the dielectric oxide coating, applying a coating of graphite over the soild electrolyte, and applying a metallic coating over the graphite.

16. The method of claim 15 wherein an electrically nonconductive masking material is applied over each of said areas of said sheet other than the portions juxtaposed with said porous masses prior to forming said coating of solid electrolyte on each of said masses.

17. A method according to claim 13 wherein the film-forming metal is selected from the group consisting of tantalum, aluminum, zirconium, niobium and titanium.

18. A method according to claim 17 in which the solid electrolyte is manganese dioxide, and the electrically conductive layer comprises a layer of graphite in contact with the manganese dioxide and a coating of silver covering the layer of graphite.

References Cited

UNITED STATES PATENTS

| 2,389,420 | 11/1945 | Deyrup | 29—25.42 |
| 2,531,389 | 11/1950 | Brandt | 29—25.42 XR |
| 3,006,069 | 10/1961 | Rhoads et al. | 29—624 XR |
| 3,075,866 | 6/1958 | Baker et al. | 29—624 |
| 3,100,329 | 8/1963 | Sherman | 29—570 |
| 3,201,667 | 8/1965 | Varga | 29—25.42 XR |
| 3,205,555 | 9/1965 | Balde et al. | 29—25.42 XR |
| 3,284,683 | 11/1966 | Reith | 29—25.42 XR |
| 3,299,326 | 1/1967 | Gluyas et al. | 29—570 XR |
| 3,302,074 | 1/1967 | Black | 29—570 XR |
| 3,333,333 | 8/1967 | Noack | 29—604 |

OTHER REFERENCES

"I.B.M. Technical Disclosure Bulletin," volume 9, No. 9, February 1967, page 1114.

"Fixed Capacitors," by G.W.A. Dummer, vol. 3, 2nd Edition, 1964, pages 173–181.

JOHN F. CAMPBELL, Primary Examiner

R. B. LAZARUS, Assistant Examiner

U.S. Cl. X.R.

317—230